United States Patent
Van der Putten et al.

[11] Patent Number: 6,072,810
[45] Date of Patent: Jun. 6, 2000

[54] METHOD TO TRANSPARENTLY TRANSPORT AN INCOMING CLOCK SIGNAL OVER A NETWORK SEGMENT, AND RELATED TRANSMITTER AND RECEIVER UNIT

[75] Inventors: Frank Octaaf Van der Putten, Hombeek; Paul Marie Pierre Spruyt, Heverlee, both of Belgium

[73] Assignee: Alcatel, Paris, France

[21] Appl. No.: 08/965,141

[22] Filed: Nov. 6, 1997

Related U.S. Application Data

[60] Provisional application No. 60/052,128, Jul. 10, 1997.

[30] Foreign Application Priority Data

Nov. 8, 1996 [EP] European Pat. Off. ............. 96402394

[51] Int. Cl.[7] ........................................................ H04J 3/06
[52] U.S. Cl. ........................... 370/503; 370/516; 375/371
[58] Field of Search ..................................... 370/503, 508, 370/516, 518, 527, 528; 375/371

[56] References Cited

U.S. PATENT DOCUMENTS 5,260,978   11/1993   Fleisher et al. .
5,790,608   8/1998   Benayoun et al. ....................... 375/356

FOREIGN PATENT DOCUMENTS 0705000   4/1996   European Pat. Off. .

OTHER PUBLICATIONS

IEEE Transactions on Communications, vol. 43, No. 2/04 Part 03, Feb. 1, 1995, pp. 1810–1818 "Synchronous Techniques for Timing Recovery in BISDN" by Lau R. C et al.
BT Technology, vol. 13, No. 3, Jul. 1, 1995, pp. 35–45, "Timing Issues of Constant Bit Rate Services Over ATM" by Mulvey M. et al.
Innovations in Switching Technolgoy, Stockholm, May 28–Jun. 1, 1990 vol. 6, No. 13, Institute of Electrical & Electronics Engineers, pp. 25–28, "Integrating Video Codecs in ATM Networks".
ANSI American National Standards Institure, ANSI TI.413–1995, Network and Customer Installation Interfaces, Asymmetric Digital Subscriber Line (ADSL) Metallic Interface.

*Primary Examiner*—Joseph L. Felber
*Attorney, Agent, or Firm*—Ware, Fressola, Van Der Sluys & Adolphson LLP

[57] ABSTRACT

To transparently transport an incoming clock signal (CLK2) with a known frequency over a network segment wherein transmission between a transmitter (TX) and a receiver (RX) operates synchronous to a transmit clock signal (CLK1) and receiver clock signal (CLK1') which are synchronized, the transmitter measures the phase difference (P) between the incoming clock signal (CLK2) and a reference signal (R) obtained from the transmit clock signal (CLK1). The measured phase difference (P) is communicated to the receiver (RX) and used therein to generate a copy clock signal (CLK2).

15 Claims, 1 Drawing Sheet

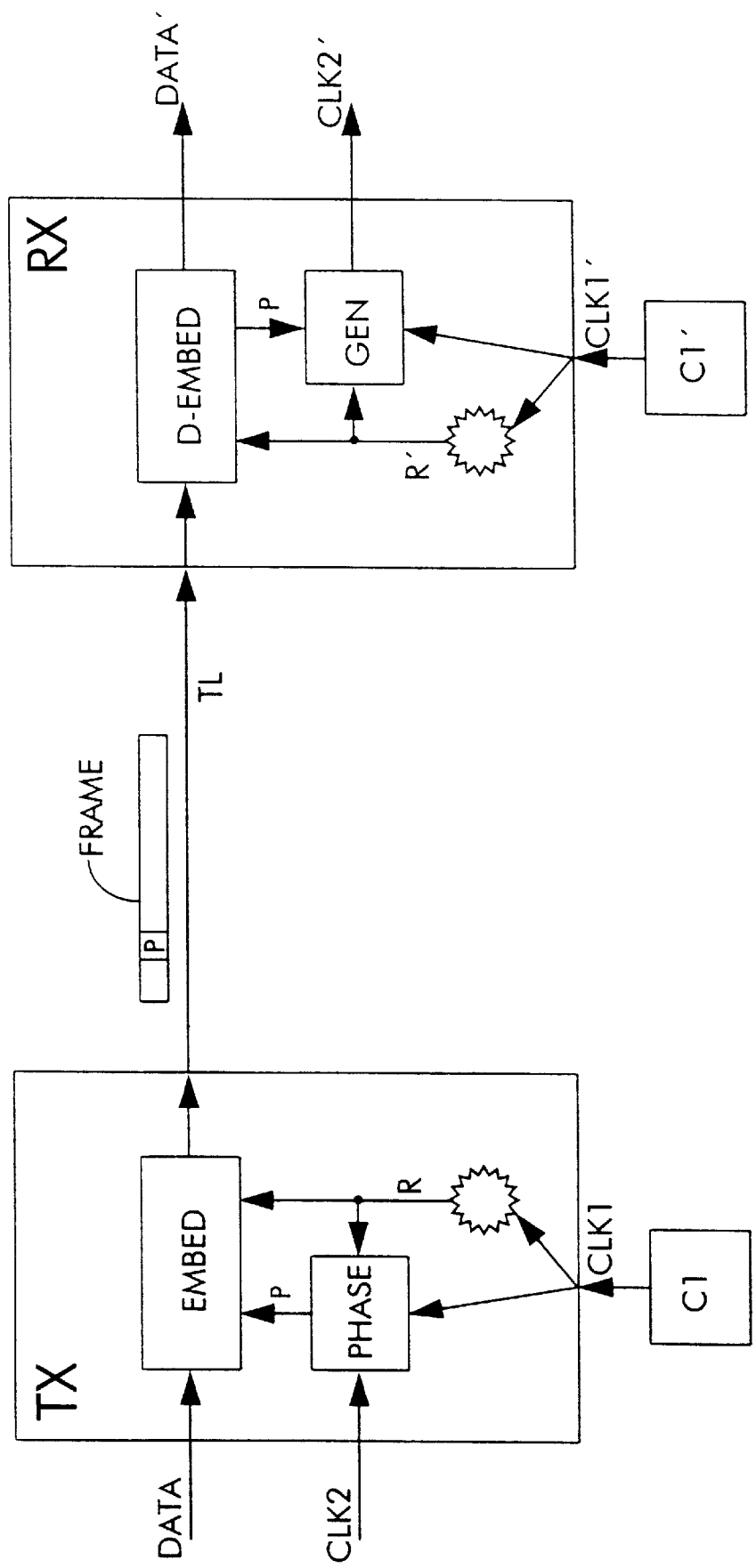

METHOD TO TRANSPARENTLY TRANSPORT AN INCOMING CLOCK SIGNAL OVER A NETWORK SEGMENT, AND RELATED TRANSMITTER AND RECEIVER UNIT

This application claims the benefit of U.S. Provisional Application No. 60/052,128, filed on Jul. 10, 1997.

TECHNICAL FIELD

The present invention relates to a method to transparently transport an incoming clock signal over a network segment and to a transmitting unit and a receiving unit equipped to perform this method.

BACKGROUND OF THE INVENTION

As is well known in the art, such a method is to be used for instance in telecommunication networks wherein a network timing reference signal is to be transported over the network but wherein data are transported over a network segment synchronised to a timing reference signal internal for this network segment. The network timing reference signal has to be transmitted over this network segment although it may not be used therein. Within a segment of an ATM (Asynchronous Transfer Mode) network, data may for instance be transmitted over a telephone line in accordance with the ADSL (Asymmetric Digital Subscriber Line) specifications. The transmission of data packed in ADSL frames over the telephone line between a transmitting and a receiving modem is synchronised to the modem clocks. Nevertheless, network layer specifications require that the ATM network timing reference signal be transparently transported over this ADSL network segment. From the point of view of the network segment, the ATM network timing reference signal thus is an incoming clock signal which unaffectedly has to appear at the exit of the ADSL network segment, i.e. at the output of the receiving modem. This could be done by sending the network timing reference signal over a separate transmission means or over the telephone line thereby using part of the transmission capacity of this line. Moreover, this way of transmitting the network timing reference signal implies a considerable complexity increase for the transmitter and receiver.

SUMMARY OF THE INVENTION

An object of the present invention is therefore to realise the transmission of the timing reference signal in an efficient way, i.e. without huge complexity increase of the transmitter and receiver in the network segment over which the clock signal is to be transported.

According to the invention, this object is realised by a method to transparently transport an incoming clock signal with a well-known frequency over a network segment consisting of a transmitting unit to an input of which the incoming clock signal is applied and to a clock input of which a transmit clock signal is applied by a transmitter clock, a transmission medium, and a receiving unit to a clock input of which a receive clock signal is applied by a receiver clock synchronised with the transmitter clock, wherein the method includes the steps of measuring a phase difference value between the incoming clock signal and a reference signal obtained from the transmit clock signal; transmitting the phase difference value from the transmitting unit to the receiving unit; and generating in the receiving unit an outgoing clock signal with a frequency equal to the well-known frequency, the outgoing clock signal having a phase difference with a second reference signal, similarly obtained from the receive clock signal as the reference signal is obtained from the transmit clock signal, equal to the phase difference value.

This object is also realized by a transmitting unit to a first input of which data are applied and to a second input of which an incoming clock signal is applied, the transmitting unit including: embedding means, coupled between the first input and an output of the transmitting unit, and adapted to embed the data in data frames and to apply a data frame to the output of the transmitting unit upon triggering by a reference signal derived from a transmit clock signal applied to a clock input of the transmitting unit by a transmit clock, wherein the transmitting unit further includes: phase measurement means to a first and a second input of which the incoming clock signal and the reference signal are applied respectively, and which is adapted to measure a phase difference value between the incoming clock signal and the reference signal, and to apply the phase difference value to an output of the phase measurement means; and further that the embedding means is provided with an additional input terminal connected to the output of the phase measurement means, the embedding means further being adapted to embed the phase difference value in a data frame.

This object is still further realized by a receiving unit to an input of which data frames are applied, the receiving unit including: de-embedding means with an input coupled to the input of the receiving unit, the de-embedding means being adapted to retrieve data to a first output of the receiving unit, and to retrieve a phase difference value out of a reserved field of the data frames and to apply the phase difference value to a phase output of the de-embedding means, wherein the receiving unit further includes: generating means, to whose first input connected to the phase output the phase difference value is applied, and to whose second input a second reference signal obtained from a receive clock signal applied to a clock input of the receiving unit by a receiver clock is applied, the generating means being adapted to generate an outgoing clock signal equal to the well-known frequency and with a phase difference compared to the second reference signal equal to the phase difference value.

Indeed, since transmission over the network segment is synchronised to transmit the clock signal, and since both clock signals, the transmit clock signal and receive clock signal, are synchronised, the receiving unit only has to become aware of the phase difference between the incoming clock signal and a reference signal synchronous to the transmit clock signal to be able to generate a copy of the incoming clock signal, provided that it also has a reference signal similarly synchronous to the received clock signal. The reference signal may be obtained by frequency dividing the transmit clock signal. Obviously, a similar reference signal obtained by frequency dividing the receive clock signal then has to be used at the receiver's side in combination with the measured phase difference value to generate the outgoing clock signal there. Determining the phase difference and using it in the receiver and generating a reference signal obviously requires less additional complexity in the transmitter and receiver than would be needed using known methods.

In a particular implementation of the present method wherein the additional required complexity is even more reduced, the reference signal equals the data frame clock signals.

In this way, the phase difference value is determined by measuring the time interval between the incoming clock signal and the data frame boundary each time a data frame is transmitted. The phase difference value is measured and transmitted once per data frame. If the data frame is sufficiently large (e.g. an ADSL superframe with a length of 68×250 µs), the additional overhead due to transmission of the phase difference value from transmitting to receiving unit is negligible. As will be seen later, the phase difference can easily be measured by means of a counter in this particular implementation.

An advantageous feature of this particular implementation is where the phase difference value is measured with a precision equal to one period of the transmit clock signal.

Indeed, as will be described in detail later on in the description, the just mentioned implementation with a counter can be realised so that the phase difference value is measured as an integer amount of transmit clock pulses. Since the transmit clock and the receive clock are synchronous, the phase difference to be realised in the receiving unit will also be an integer amount of receive clock pulses.

A further specific feature of the present method is that the phase difference value may be embedded in fields of the date frames.

In this way, no additional overhead is added to the data frames to transport the phase difference information. This technique is particularly recommended if, in the network segment, data are transmitted packed in data frames wherein some fields are reserved for special use.

If the data are transmitted in the network segment in accordance with the Asymmetric Digital Subscriber Line (ADSL) specifications, the phase difference values may occupy fields reserved for so called fast bytes, of Discrete Multi Tone symbols.

Indeed, an ADSL superframe contains several fast byte fields only a part of which are used for transporting operation channel related information. Consequently, the remaining fast byte fields may be used to transport the phase difference values.

Another additional feature of the present method is where the phase difference value is transmitted only when it differs from the previously measured and transmitted phase difference value.

Hence overhead occupancy by phase difference values is further reduced by transmitting phase difference values only if they differ from a previous transmitted value. Since the receiver is aware of this previous transmitted value, it can continue generating the outgoing clock signal without precision decrease when it receives no new phase difference values for a certain time period.

In an alternative embodiment, not the phase difference itself but the deviation from the previous phase difference is transmitted. Again, the overhead can be reduced further by transmitting phase difference deviation values only if they differ from a previous transmitted value. This technique is especially advantageous in case of a fixed clock offset of the incoming clock signal relative to the reference signal synchronous to the transmit clock. In this case the phase difference deviations are (almost) constant and thus need not be transmitted.

BRIEF DESCRIPTION OF THE DRAWING

The above mentioned and other objects and features of the invention will become more apparent and the invention itself will be best understood by referring to the following description of an embodiment taken in conjunction with the accompanying drawing which shows a network segment with a transmitting unit TX and receiving unit RX performing an implementation of the method according to the present invention.

BEST MODE FOR CARRYING OUT THE INVENTION

The network segment of the figure consists of the cascade connection of a transmitter TX, a telephone line TL, and a receiver RX. The transmitter TX is provided with three input terminals; a data input DATA, a network clock input CLK2, and a transmit clock input CLK1. The transmitter TX further has one output terminal and is equipped with a data embedder EMBED and a phase measuring device PHASE. The receiver RX on the other hand has an input coupled to the telephone line TL, a receive clock input CLK1', a data output DATA', and a network clock output CLK2'. The receiver RX moreover includes a data de-embedder D-EMBED and a network clock generator GEN.

In the transmitter TX, the data embedder EMBED is coupled between the data input DATA and output terminal of the transmitter TX. The network clock input CLK2 serves as an input for the phase measuring device PHASE, and also the transmit clock input CLK1 is connected to an input of the phase measuring device PHASE. An output of the phase measuring device PHASE and an input of the data embedder EMBED are interconnected. The transmitter TX in the figure further contains an unlabeled star shaped device which may represent any kind of means which transforms the transmit clock signal CLK1 into a reference signal R. The reference signal R is thus nothing but a transformed clock signal CLK1, is synchronous with this clock signal CLK1 and is applied to inputs of the data embedder EMBED and phase measurement means PHASE respectively.

In the receiver RX, the data de-embedder is coupled between the input coupled to the telephone line TL and the data output DATA'. A phase output P of the de-embedder is connected to a first input of the network clock generator GEN, which has a second input interconnected with the receive clock input CLK1' and an output connected to the network clock output CLK2' of the receiver RX. A similar star shaped, unlabeled device is drawn in the receiver RX to represent any kind of means, e.g. a sequence of frequency dividers, which transforms the receive clock signal CLK1' into a reference signal R' similar to the transformation in the transmitter TX. The reference signal R' is applied to inputs of the data de-embedder D-EMBED and network clock generator GEN respectively.

Two clocks, C1 and C1', in the figure represent the transmit clock and receive clock respectively which generate the transmit clock signal and receive clock signal respectively. For evident reasons, their outputs are coupled to the transmit clock input CLK1 of the transmitter TX and receiver clock input CLK1' of the receiver RX respectively.

To illustrate the working of the drawn network segment according to the present invention, it will be supposed in the following paragraphs that ATM cells are applied to the data input DATA of the transmitter TX to be transported over the telephone line TL. These ATM cells are accompanied by a network clock signal which is applied to the transmitter TX via the network clock input CLK2. The network clock signal typically is an 8 kHz signal, i.e. a signal with a pulse every 125 µs. The transmitter TX and receiver RX can communicate with each other and conform to the ADSL Specification. In other words, the transmitter is an ADSL modem, which groups incoming data DATA in DMT (Discrete Multi Tone)

symbols and embeds these DMT symbols in successive frames to constitute with 68 successive frames, a so-called ADSL superframe FRAME. The functional blocks of such an ADSL modem, and the structure of DMT symbols, frames and superframes in ADSL are well known by persons skilled in the art. The description thereof is not relevant in view of the present invention. For more details concerning these topics, reference is made to the approved version of the ANSI (American National Standards Institute, Inc.) Standard on ADSL, referred to as ANSI T1.413 and entitled "Network and Customer Installation Interfaces, Asymmetric Digital Subscriber Line (ADSL) Metallic Interface". The embedding of incoming data DATA in DMT symbols and ADSL superframes is realised by the embedder EMBED. Each time the reference signal R shows a pulse, the embedder EMBED applies an ADSL superframe via its output to the telephone line TL. The inverse operation is performed by the de-embedder D-EMBED in the receiver RX, triggered by the second reference signal R' which is obtained via similar frequency dividers from the receive clock signal CLK1'. The reference signal R is obtained from the transmit clock signal CLK1 by frequency division. The transmit clock signal CLK1, in this case the ADSL modem clock, has a frequency of 2.208 MHz.

The ATM network layer specifications require that the ATM network clock signal CLK2 of 8 kHz be transported throughout the whole network. The ADSL network segment comprising the transmitter TX, telephone line TL and receiver RX thus has to carry the ATM network clock signal from transmitter TX to receiver RX. For the ATM network, the ADSL network segment is a black box as a result of which it is not important how the network clock signal is transported between TX and RX. The next paragraph describes in a detailed way how the information necessary to enable the receiver RX to reconstitute the ATM network clock signal is determined in the transmitter TX. A subsequent paragraph explains how this information can be embedded in the ADSL superframes to be transferred to the receiver, and a third paragraph is dedicated to the processing in the receiver RX so as to generate the network clock signal from the receiver information.

Since the frequency of the ATM network clock signal is well-known (8 kHz), no information has to be transmitted between TX and RX with respect thereto. Dividing the modem clock signals (the transmit clock signal CLK1 in TX and receive clock signal CLK1' in RX) of 2.208 MHz through 276 results in a new signal with a frequency of 8 kHz, i.e. the ATM network clock frequency. The receiver RX thus only has to be given phase information of the incoming ATM clock signal CLK2 to be able to generate a perfect copy thereof at its network clock output CLK2'. The phase measurement device PHASE thereto determines the phase difference between the incoming ATM network clock signal CLK2 and the reference signal R which triggers the transmission of the ADSL superframes. In the phase measurement means PHASE, a counter value is reset to zero when the reference signal R shows a pulse. At that moment, the embedder EMBED transmits an ADSL superframe. The counter value is increased by one each time the transmit clock signal CLK1 shows a pulse, and the counter value P is applied via the output of the phase measurement means PHASE to the embedder EMBED when the ATM network clock CLK2 shows a pulse. Summarising, the phase measurement device PHASE counts the number of transmit clock pulses between the boundary of an ADSL superframe and a network clock pulse. This number is a measure of the phase difference P between CLK2 and R and will be transmitted to the receiver RX.

The embedder EMBED has the task to incorporate the phase difference P in the ADSL superframe. This superframe has a length of 68 DMT symbols, i.e. 68×250 $\mu$s in time. Each DMT symbol contains a so called fast byte field. This field may be used for special purposes, such as transport of operation channel information, STM synchronisation information, etc. The already cited ADSL Standard Specification specifies how the fast byte fields of the first two DMT symbols in an ADSL superframe have to be used. The contents of other fast bytes, i.e. those of DMT symbols 3 to 68, is not defined in the Specification. Hence, one of these bytes may be used to transport the phase difference P from transmitter TX to receiver RX. Since one DMT symbol has a length of 250 $\mu$s and the phase measurement means PHASE receives a pulse on CLK2 every 125 $\mu$s, the value P is certainly determined at the end of the first DMT symbol of an ADSL superframe. As a consequence, it is no problem for the embedder EMBED to fill one of the fast bytes in DMT symbols 3 to 68 with the value P.

It is to be remarked that a smart embedder first checks whether the measured phase difference P differs from a previous measured value or not. To minimise use of bandwidth for transmission of phase difference values, the smart embedder writes the value of P in the fast byte field only when there is a difference.

At the receiver's side, the de-embedder retrieves the value P from the fast byte field each time an ADSL superframe arrives, i.e. for each pulse of the reference signal R'. The phase difference value P then is applied to the generator GEN which constitutes the outgoing network clock signal CLK2'. From the receive clock signal CLK1' with a frequency of 2.208 MHz, an 8 kHz clock signal is created, again by a frequency division though 276. This 8 kHz clock signal needs to have a phase difference of P receive clock pulses with reference signal R' to be a perfect copy of the incoming ATM network clock signal CLK1. The generator GEN thus manipulates the 8 kHz signal obtained by frequency division of CLK1', e.g. by delaying the pulses so that the first pulse appears P clock periods of receive clock C1' after reference signal R' has shown a pulse.

It is noticed that the above embodiment is described in terms of functional blocks. The functional blocks, as is clear from the description of their working, contain no unknown components. Consequently, it is apparently obvious to a person skilled in the art of designing electronic circuits how to implement the different blocks EMBED, PHASE, D-EMBED and GEN, given the above description of the functions performed by these blocks.

It should further be remarked that embedding the phase difference value P in fast byte locations is not a necessity when applying the clock transport method according to the present invention. Many alternative solutions, for instance using sync byte fields in ADSL superframes for phase difference value transport, can be thought of without inventive effort.

It should even be noted that the present invention is not limited to systems wherein the phase difference value P is transmitted embedded in frames, since it is obvious to any person skilled in the art, that the measured phase difference value may also be transmitted separated from the frames, e.g. in a time multiplexed or frequency multiplexed way with the frames, to enable the receiver to reconstruct the network clock signal CLK2.

Also a remark is that the phase measurement does not necessarily have to be executed each time a frame is transmitted from transmitter to receiver. The frequency of phase measurements is completely free. It is evident that there exists a trade-off between precision of the outgoing network clock and the amount of bandwidth resources used on the link. As the transmitter measures phase more frequently, more bandwidth is needed on the link between the transmitter and the receiver to transport the phase information. Consequently, a copy of the incoming network clock signal CLK2 can be generated more precisely in the receiver.

Another parameter which may influence the precision of the generated outgoing network clock is the used phase measurement technique. In view of this, it should be noted that an implementation wherein a counter is used which determines the phase difference P as an amount of transmit clock periods is only one of the many variant techniques to measure the phase difference.

Furthermore, it has to be remarked that although the above described network segment is an ADSL segment receiving ATM cells at its data input and an accompanying ATM clock signal of 8 kHz, the present invention is not restricted thereto. It is clear to a person skilled in the art that minor modifications of the above described method allow it to be implemented in other networks, e.g. SDH (Synchronous Digital Hierarchy) networks, wherein data and network clock signals have to be transported over non ADSL network segments, e.g. VDSL (Very High Speed Digital Subscriber Line) segments, HFC (Hybrid Fiber Coax) segments, and so on.

A last remark is that, although the data symbols in the above described network segment are transported over a telephone line TL, the applicability of the present invention is not restricted by the transmission medium via which the data are transported. In particular, on any connection between two communicating units, TX and RX, e.g. a cable connection, an optical connection, a satellite connection, a radio link through the air, and so on, the present invention may be realised.

While the principles of the invention have been described above in connection with specific apparatus, it is to be clearly understood that this description is made only by way of example and not as a limitation on the scope of the invention.

We claim:

1. A method to transparently transport an incoming clock signal (CLK2) with a known frequency over a network segment consisting of a transmitting unit (TX), a transmission medium (TL), and a receiving unit (RX), wherein said transmitting unit (TX) has an transmitter input for receiving said incoming clock signal (CLK2) and a clock input for receiving a transmit clock signal (CLK1) from a transmitter clock (C1), and said receiving unit (RX) has a clock input for receiving a receive clock signal (CLK1') from a receiver clock (C1') which is synchronised with said transmitter clock (C1), characterised in that said method comprises the steps of:
a) measuring a phase difference value (P) between said incoming clock signal (CLK2) and a reference signal (R) obtained from said transmit clock signal (CLK1);
b) transmitting said phase difference value (P) from said transmitting unit (TX) to said receiving unit (RX); and
(c) generating in said receiving unit (RX) an outgoing clock signal (CLK2') with a frequency equal to the known frequency, said outgoing clock signal (CLK2') having a phase difference from a second reference signal (R') equal to said phase difference value (P), wherein the way said second reference signal (R') is obtained from said receive clock signal (CLK1') is substantially the same as the way said reference signal (R) is obtained from said transmit clock signal (CLK1).

2. A method according to claim 1, characterised in that said transmitting unit (TX) transmits data frames (FRAME) via said transmission medium (TL) to said receiving unit (RX), whereby transmission of each one of said data frames (FRAME) is triggered by said reference signal (R).

3. A method according to claim 2, characterised in that said phase difference value (P) is measured with a precision equal to one period of said transmit clock signal (CLK1).

4. A method according to claim 2, characterised in that said measured phase difference value (P) is embedded in one of said data frames (FRAME) to be transmitted to said receiving unit (RX) in step b.

5. A method according to claim 2, characterised in that said transmitting unit (TX) and said receiving unit (RX) are of the Asymmetric Digital Subscriber Line (ADSL) transmitter and receiver type respectively, said data frames (FRAME) are Asymmetric Digital Subscriber Line superframes, as defined in ANSI Standard T1.413, said incoming clock signal (CLK2) is a network timing reference signal, and said transmit clock signal (CLK1) and received clock signal (CLK1') are Asymmetric Digital Subscriber Line modulator and demodulator timing references respectively.

6. A method according to claim 5, characterised in that said phase difference value (P) is embedded in fast byte fields of Discrete Multi Tone (DMT) symbols of said Asymmetric Digital Subscriber Line superframes.

7. A method according to claim 5, characterised in that said phase difference value (P) is embedded in fast byte fields of Discrete Multi Tone (DMT) symbols of said Asymmetric Digital Subscriber Line superframes.

8. A method according to claim 1, characterised in that said phase difference value (P) is transmitted only when it differs from the previously measured and transmitted phase difference value.

9. A transmitter (TX) having a first input for receiving data (DATA), a second input for receiving an incoming clock signal (CLK2), a third input for receiving a transmitter clock signal (CLK1), and an output, said transmitter (TX) comprising:
a) an embedding circuitry (EMBED) coupled between said first input and said output, said embedding circuitry (EMBED) adapted to embed said data (DATA) in data frames (FRAME) and to output said data frames (FRAME) to said output when said embedding circuitry (EMBED) is triggered by a reference signal (R) derived from said transmitter clock signal (CLK1); and
b) a phase measurement circuitry (PHASE) coupled between said second input and a fourth input for receiving said reference signal (R), wherein said phase measurement circuitry (PHASE) is adapted to measure a phase difference value (P) between said incoming clock signal (CLK1) and said reference signal (R) and to output said phase difference value (P) to said embedding circuitry (EMBED);

wherein said embedding circuitry (EMBED) is further adapted to embed in one of said data frames (FRAME) a deviation of said phase difference value (P) from a previously measured phase difference value.

10. A transmitter (TX) according to claim 9, wherein said phase measurement circuitry (PHASE) comprises a clock counter having:

a first counter input for receiving said transmitter clock signal (CLK1), a second counter input for receiving said reference signal (R), and a third counter input for receiving said incoming clock signal (CLK2), wherein said clock counter is adapted to increase a counter value when the first counter input receives a pulse, to reset said counter value when the second counter input receive a pulse, and to output said counter value to said embedding circuitry (EMBED) when the third counter input receives a pulse.

11. An Asymmetric Digital Subscriber Line transmitter (TX) having a first input for receiving data (DATA), a second input for receiving a network timing reference signal (CLK2), a third input for receiving a transmitter sampling clock signal, and an output, said Asymmetric Digital Subscriber Line transmitter (TX) comprising:

a) an embedding circuitry (EMBED) coupled between said first input and said output, wherein said embedding circuitry is adapted to embed said data (DATA) in data frames (FRAME) and to output said data frames (FRAME) to said output when said embedding circuitry is triggered by a local timing reference signal (R) derived from an Asymmetric Digital Subscriber Line transmitter clock signal (CLK1); and b) a phase measurement circuitry (PHASE) coupled between said second input and a fourth input for receiving said local timing reference signal (R), wherein said phase measurement circuitry (PHASE) is adapted to measure a phase offset value (P) between said network timing reference signal (CLK2) and said local timing reference signal (R), and to output said phase offset value (P) to said embedding circuitry (EMBED); wherein said embedding circuitry (EMBED) is further adapted to embed said phase offset value (P) in one of said data frames (FRAME).

12. A receiver (RX) having a receiver input for receiving data frames (FRAME), a clock input for receiving a receiver clock signal (CLK1'), a receiver output and a clock output, said receiver (RX) comprising:

a) a recovery circuitry (D-EMBED) adapted to retrieve data (DATA') from said data frames (FRAME), to output said retrieved data (DATA') to said receiver output, and to recover a deviation of a phase difference value (P) from a previously recovered phase difference value out of a reserved field within said data frames (FRAME);

b) a reference signal circuitry adapted to generate a reference signal (R') from said receiver clock signal (CLK1'); and c) a clock generator (GEN) having a first input for receiving said phase difference value (P), a second input for receiving said reference signal (R'), and a third input for receiving said receiver clock signal (CLK1'), wherein said clock generator (GEN) is adapted to generate a clock signal (CLK2') having a phase difference from said reference signal (R') substantially equal to said phase difference value (P) number of clock cycles of said receiver clock signal (CLK1').

13. A receiver according to claim 12, wherein said clock generator (GEN) comprises:

a frequency divider adapted to frequency divide said receiver clock signal (CLK1') in order to generate a lower frequency clock signal; and a delay circuitry adapted to delay said lower frequency clock signal from a reference signal pulse by said phase difference value (P) number of clock cycles of said receiver clock signal (CLK1').

14. An Asymmetric Digital Subscriber Line receiver (RX) having a receiver input for receiving data frames (FRAME), a clock input for receiving a receiver sampling clock signal (CLK1'), a receiver output and a clock output, said Asymmetric Digital Subscriber Line receiver (RX) comprising:

a) a recovery circuitry (D-EMBED) adapted to retrieve data (DATA') from said data frames (FRAME), to output said retrieved data (DATA') to said receiver output, and to recover a phase offset value (P) out of a reserved field within said data frames (FRAME);

b) a local timing reference signal circuitry adapted to generate a local timing reference signal (R') from said receiver sampling clock signal (CLK1'); and c) a clock generator (GEN) having a first input for receiving said phase offset value (P), a second input for receiving said local timing reference signal (R'), and a third input for receiving said receiver sampling clock signal (CLK1'), wherein said clock generator (GEN) is adapted to generate a clock signal (CLK2') having a phase offset from said local timing reference signal (R') generally equal to said phase offset value (P) number of clock cycles of said receiver sampling clock signal (CLK1').

15. A method to transparently transport a network timing reference signal (CLK2) having a known frequency from an input into a transmitter (TX) to an output of a receiver (RX) wherein a transmitter sampling clock signal (CLK1) is available in said transmitter (TX) and a receiver sampling clock signal (CLK1') is available in said receiver (RX), said transmitter sampling clock signal (CLK1) and receiver sampling clock signal (CLK1') being synchronised, said method comprising the steps of:

a) measuring a phase offset value (P) between said network timing reference (CLK2) and a first local timing reference signal (R) obtained from said transmitter sampling clock signal (CLK1);

b) transmitting said phase offset value (P) from said transmitter (TX) to said receiver (RX); and c) generating in said receiver (RX) an outgoing clock signal (CLK2') with a frequency equal to said known frequency, and with a phase offset from a second local reference signal (R'), obtained from said receiver sampling clock signal (CLK1'), substantially equal to said phase offset value (P) number of cycles of said receiver sampling clock signal (CLK1').

* * * * *

UNITED STATES PATENT AND TRADEMARK OFFICE
CERTIFICATE OF CORRECTION

PATENT NO. : 6,072,810
DATED : June 6, 2000
INVENTOR(S) : Frank Octaaf Van der Putten
Paul Marie Pierre Spruyt It is certified that error appears in the above-identified patent and that said Letters Patent is hereby corrected as shown below:

On the Title Page, [Abstract], line 11, "CLK2" should be --CLK2'--.

In column 9, claim 10, line 12, "receive" should be --receives--.

In column 10, claim 15, line 11, after "reference", please insert --signal--.

Signed and Sealed this

Twenty-seventh Day of March, 2001

Attest:

NICHOLAS P. GODICI

Attesting Officer

*Acting Director of the United States Patent and Trademark Office*